(12) United States Patent
Gumbel et al.

(10) Patent No.: US 10,602,881 B2
(45) Date of Patent: Mar. 31, 2020

(54) HERBAL GRINDER SYSTEM WITH A ROTATABLE CHUTE

(71) Applicant: Mike Gumbel, Philadelphia, PA (US)

(72) Inventors: Mike Gumbel, Philadelphia, PA (US); Declan Halpin, New Bedford, MA (US)

(73) Assignee: Mike Gumbel, Philadelphia, PA (US)

( * ) Notice: Subject to any disclaimer, the term of this patent is extended or adjusted under 35 U.S.C. 154(b) by 806 days.

(21) Appl. No.: 15/001,481

(22) Filed: Jan. 20, 2016

(65) Prior Publication Data

US 2017/0202396 A1   Jul. 20, 2017

(51) Int. Cl.
*A47J 42/40* (2006.01)
*A47J 42/14* (2006.01)
*A47J 42/12* (2006.01)
*A24B 7/06* (2006.01)

(52) U.S. Cl.
CPC ............. *A47J 42/40* (2013.01); *A47J 42/12* (2013.01); *A47J 42/14* (2013.01); *A24B 7/06* (2013.01)

(58) Field of Classification Search
CPC .. A47J 42/40; A47J 42/42; A47J 42/12; A47J 42/14
USPC .......................................................... 241/25
See application file for complete search history.

(56) References Cited

U.S. PATENT DOCUMENTS

| | | |
|---|---|---|
| 1,099,896 A * | 6/1914 | Harbeck .............. B65D 47/046 222/532 |
| 6,443,378 B1 | 9/2002 | Huang et al. |
| 7,422,170 B2 | 9/2008 | Bao |
| 8,393,563 B2 | 3/2013 | Chaoui et al. |
| 8,733,679 B2 | 5/2014 | Camitta |
| D723,878 S | 3/2015 | Smith |
| D724,394 S | 3/2015 | Smith |
| 2017/0164786 A1 * | 6/2017 | Camitta ................... A47J 42/40 |

* cited by examiner

*Primary Examiner* — Elaine Gort
*Assistant Examiner* — Christopher B Wehrly
(74) *Attorney, Agent, or Firm* — Kenneth R. DeRosa, Esq.; Lauletta Birnbaum, LLC (57) ABSTRACT

A grinder system including an upper body, a dispenser, a grinder portion, a chute, a filter body, and a lower body. The dispenser may have a dispenser wall about a central axis and with a dispenser window. The grinder portion may have a platform with a plurality of holes and a second plurality of teeth facing the upper body. The chute may be rotatably coupled to the dispenser wall about a chute axis. The chute may be configured to cover the dispenser window in a closed configuration and rotate about the chute axis to uncover at least a portion of the dispenser window in an open configuration. The grinder portion may be part of or separate from the dispenser.

6 Claims, 10 Drawing Sheets

HERBAL GRINDER SYSTEM WITH A ROTATABLE CHUTE

FIELD

A grinder system, and more particularly, an herbal grinder system with a rotatable chute, and methods of using the same.

BACKGROUND

Traditional grinders may be utilized to grind herbs. The typical grinder includes various components that are disassembled to receive herbs and then disassembled again to dispense the ground herbs. Typical grinders further lack structures to direct the ground herbs during dispensing. There is a need for a grinder system that dispenses products such as herbs without requiring disassembly of the grinder system and includes a structure to facilitate the dispensing of the same.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

A grinder system may be configured to grind and dispense a product. An exemplary product may include anything that may be ground and used for such things as smoking, flavoring, scent, or medicine. For example, the product may include herbs, spices, food, vitamins, or pills. Herbs may include any portion of a plant including leaves, seeds, flowers, or a combination thereof.

An exemplary grinder system may include an upper body, a dispenser, a grinder portion, a chute, a filter body, and a lower body. The upper body may include a top, an upper wall, and a plurality of teeth. The dispenser may include a dispenser wall about a central axis and with a dispenser window. The grinder portion may include a platform with a plurality of holes and a second plurality of teeth facing the upper body. The chute may be rotatably coupled to the dispenser wall about a chute axis. The chute may be configured to cover the dispenser window in a closed configuration and rotate about the chute axis to uncover at least a portion of the dispenser window in an open configuration. The filter body may include a filter wall configured to releasably connect with the dispenser wall. The lower body may include a base and a lower wall configured to releasably connect with the filter wall. The dispenser may be part of or separate from the grinder portion.

Methods of using a grinder system are also contemplated. A method may include providing an upper body having a plurality of teeth, a dispenser having a dispenser wall about a central axis and with a dispenser window, and a chute rotatably coupled to the dispenser wall about a chute axis. The method may include rotating the upper body about the central axis while the chute is in a closed configuration to grind a product and rotating the chute about the chute axis to an open configuration to dispense the product. Thus, the grinder system may grind and dispense products without disassembly and using the chute to direct the ground product.

Figure 1:
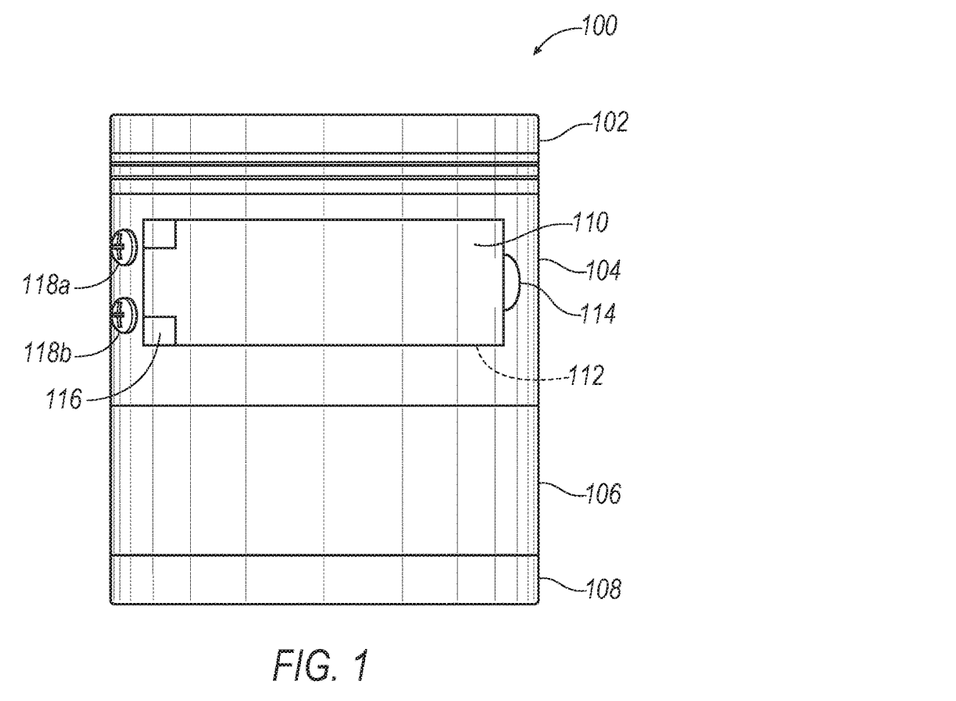
FIG. 1 illustrates a front view of a grinder system of the present disclosure, e.g., in a closed configuration.
Figure 2:
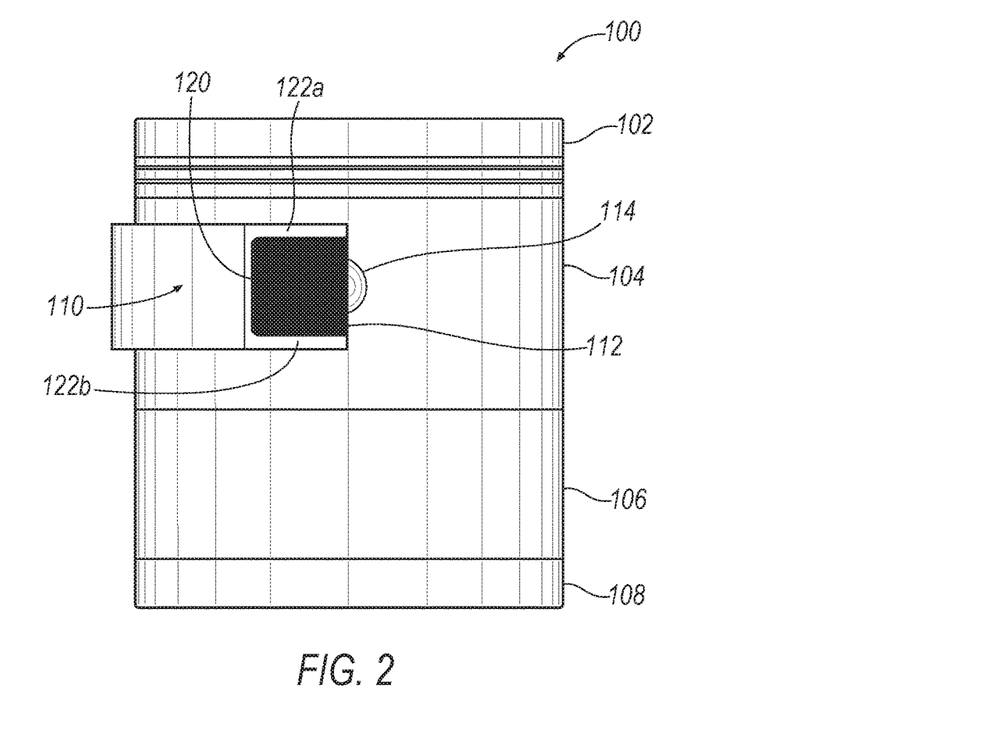
FIG. 2 illustrates a front view of the grinder system of the present disclosure, e.g., in an open configuration.

FIGS. 1-2 illustrate an exemplary grinder system 100. The grinder system 100 may include an upper body 102, a dispenser 104, a filter body 106, and a lower body 108, each of which may include an outer wall about and that extends along a central axis. For example, the dispenser 104 may include a dispenser wall that is about and extends along a dispenser axis. The dispenser 104 may include a chute 110 configured to cover the dispenser window 112 in a closed configuration as shown in FIG. 1 and rotate to uncover at least a portion of the dispenser window 112 in an open configuration as shown in FIG. 2. The dispenser 104 may include recess 114, e.g., to facilitate opening of chute 110. A hinge 116, also referred to as a swivel, may be rotatably coupled with the chute 110 and secured to the dispenser 104 with one or more fasteners 118a, 118b, e.g., a threaded screw. Fasteners 118a, 118b may include a head that is surface mounted on the dispenser wall as shown in FIG. 2 or received in a countersink into the dispenser wall as described in further detail below with respect to FIG. 6. As shown in FIG. 2, the chute 110 may include an outer wall 120 and upper and lower walls 122a, 122b, e.g., to direct the product during dispensing.

Figure 3:
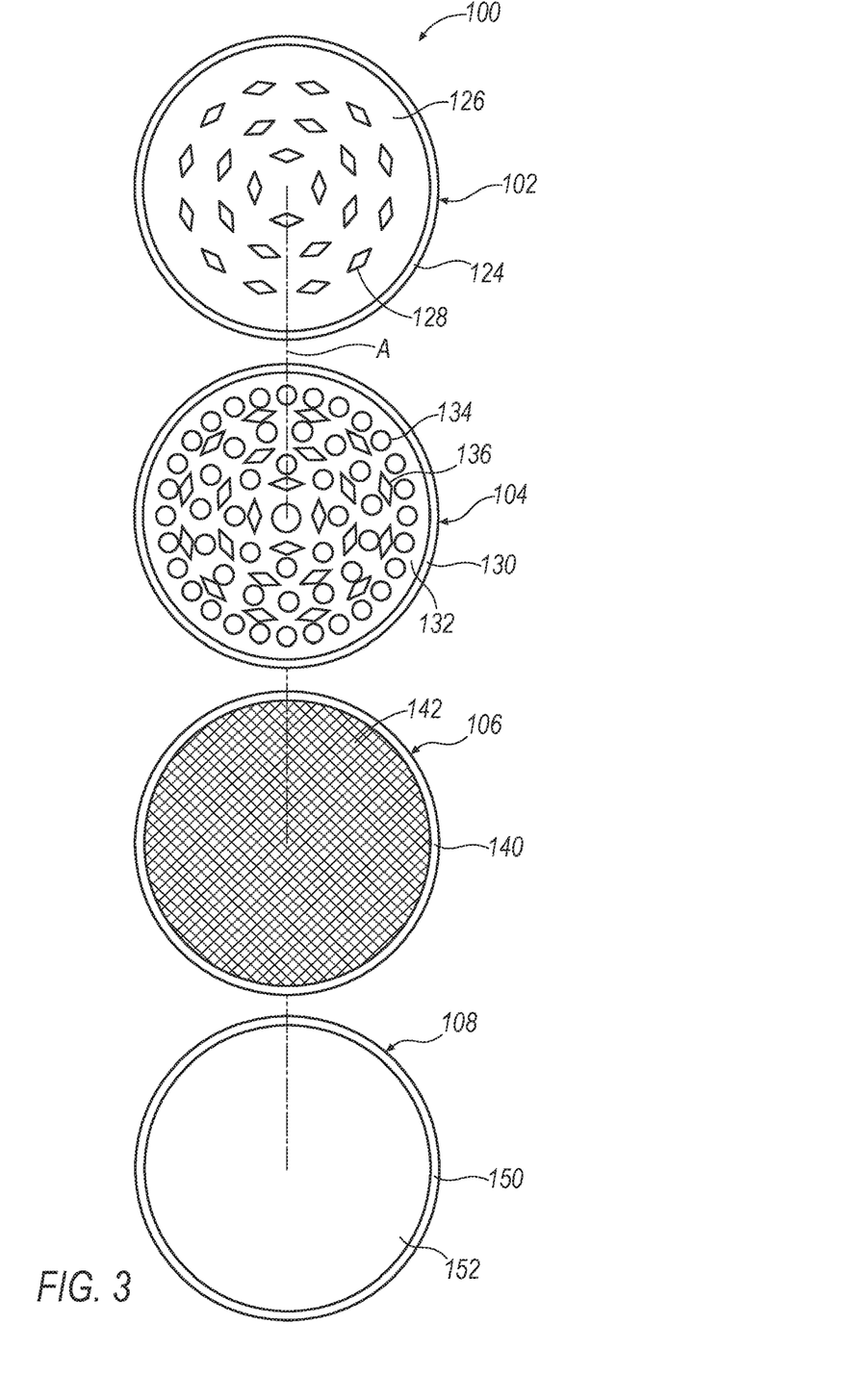
FIG. 3 illustrates an exploded view of the grinder system of the present disclosure.

FIG. 3 illustrates an exploded view of grinder system 100, e.g., showing a bottom view of upper body 102, a top view of dispenser 104, a filter body 106, and a top view of lower body 108. Upper body 102, dispenser 104, filter body 106, and lower body 108 may be aligned along central axis A and may include respective upper and lower surfaces to releasably engage each other, e.g., with any of a smooth, friction fit or threaded connection. The upper body 102 may include an upper wall 124 about the central axis A, a top 126 transverse to the central axis A, and a plurality of teeth 128 extending downwardly from the top 126, e.g., toward the dispenser 104. The dispenser 104 may include a dispenser wall 130 about the central axis A and a grinder portion (e.g., an integrated grinder portion) having a platform 132, e.g., transverse to the central axis A. The platform 132 may include a plurality of holes 134 therethrough and a plurality of teeth 136 extending upwardly therefrom, e.g., facing the upper body 102. The upper body 102 and dispenser 104 may be held along central axis A with a magnetic connection and may be configured to rotate relative to each other such that teeth 128 and teeth 136 pass between each other and thereby grind the product. The filter body 106 may include a filter wall 140 about the central axis A and a mesh or screen 142 transverse to the central axis A, e.g., to filter usable product from unwanted particulates. The lower body may have a lower wall 150 about the central axis A and a base 152 transverse to the central axis A, e.g., to hold unwanted particulates.

Figure 4:
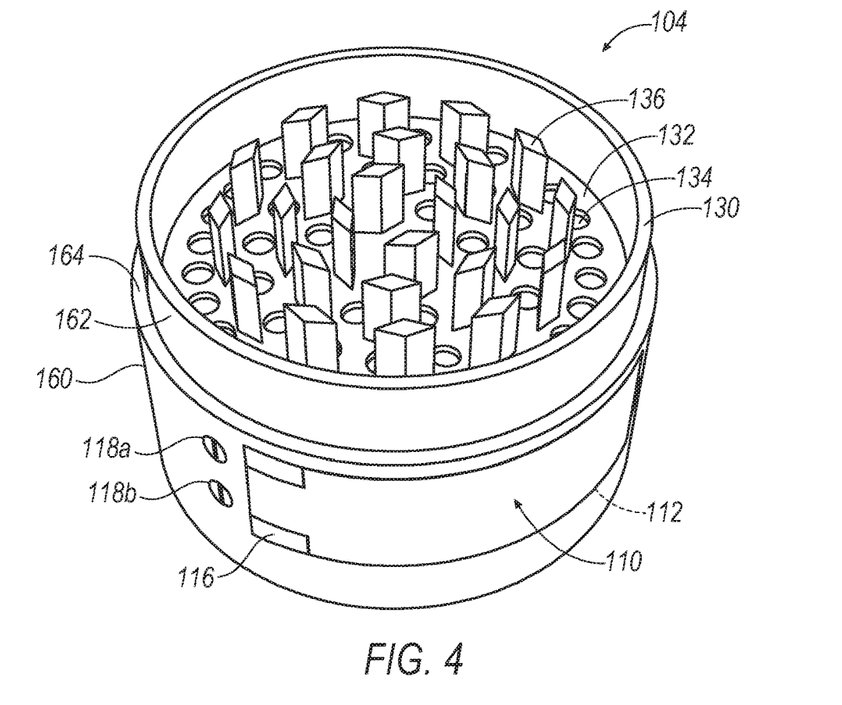
FIG. 4 illustrates an isometric view of a dispenser, e.g., in a closed configuration.
Figure 5:
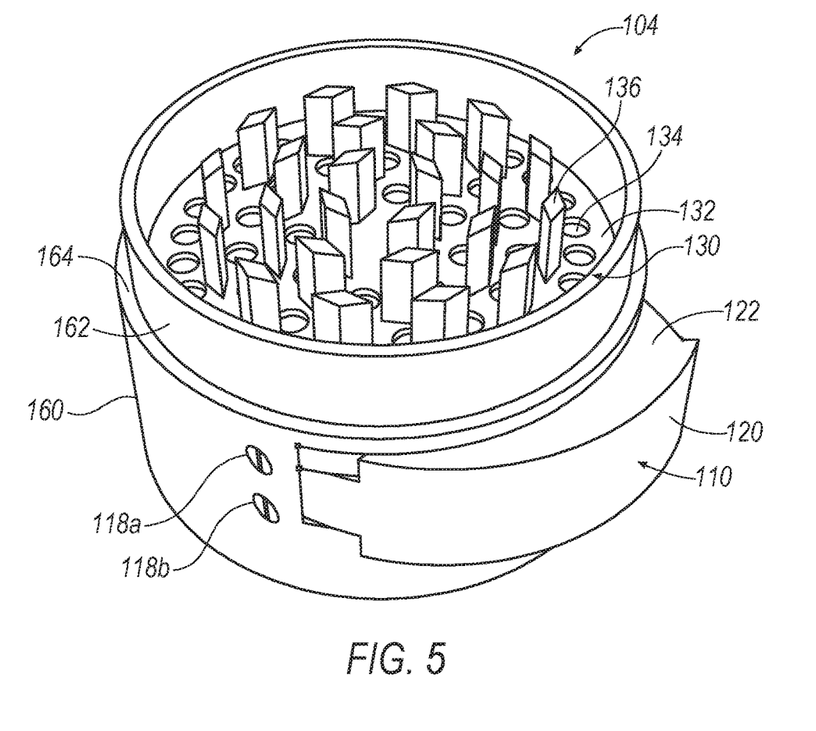
FIG. 5 illustrates an isometric view of the dispenser, e.g., in an open configuration.
Figure 6:
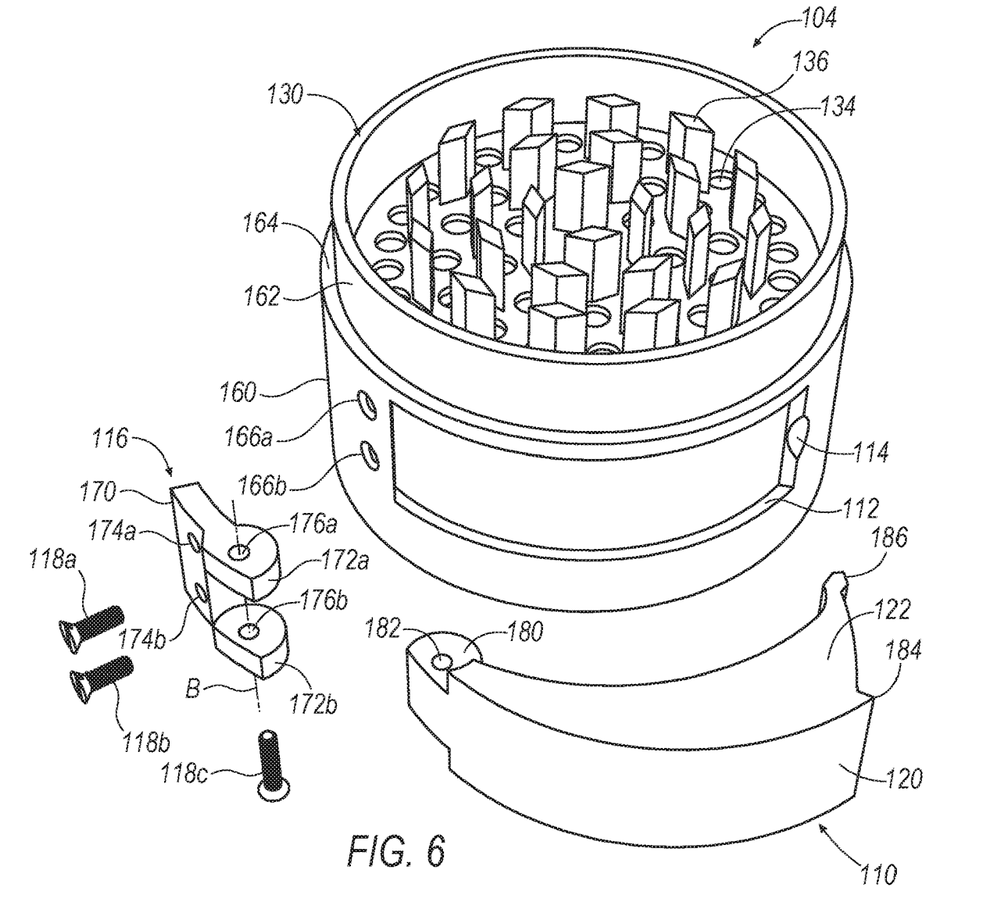
FIG. 6 illustrates an exploded view of the dispenser, e.g., having an integrated grinder portion.
Figure 7:
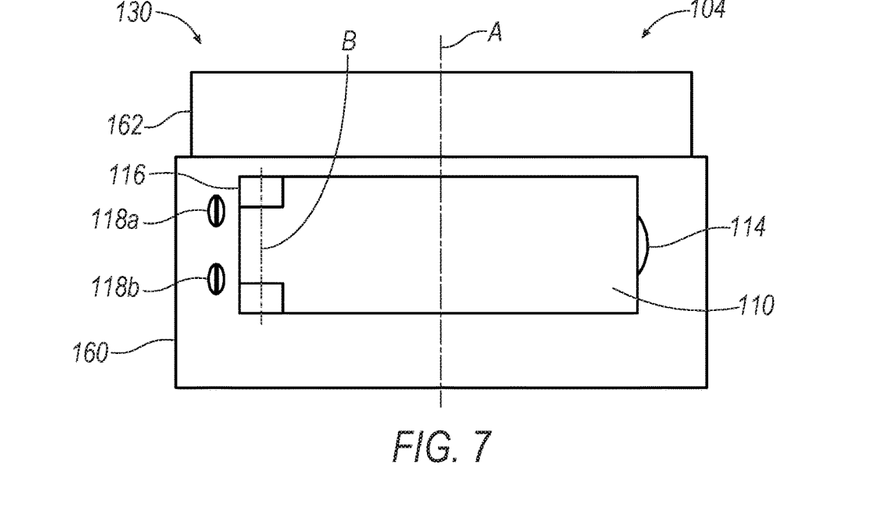
FIG. 7 illustrates a front view of the dispenser.
Figure 8:
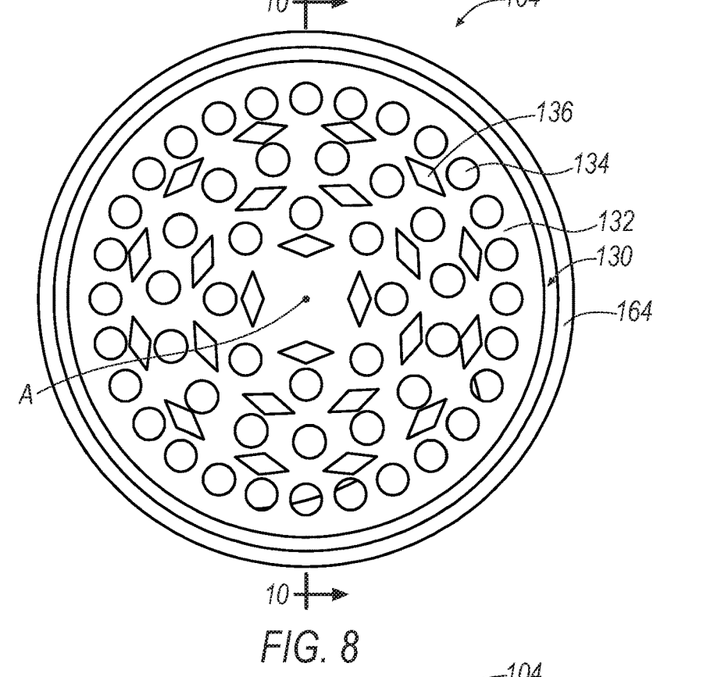
FIG. 8 illustrates a top view of the dispenser, e.g., in a closed configuration.
Figure 9:
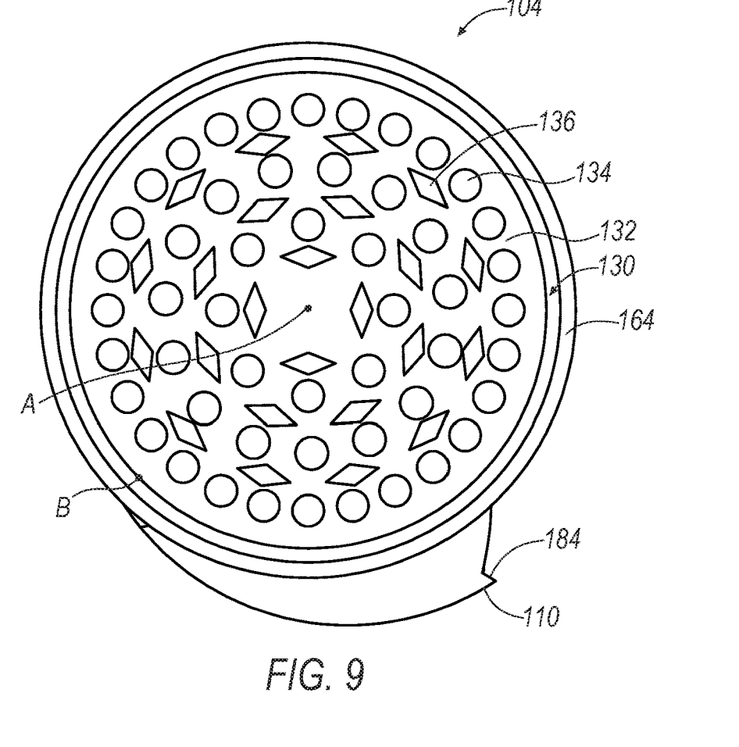
FIG. 9 illustrates a top view of the dispenser, e.g., in an open configuration.

FIGS. 4-10 illustrate an exemplary dispenser 104, e.g., with an integrated grinder portion. The chute 110 may be rotatably coupled to the dispenser wall 130 to rotate between a closed configuration as shown in FIGS. 4 and 8 and an open configuration as shown in FIGS. 5 and 9, e.g., without disassembling the dispenser 104 from the grinder system 100. As shown in FIG. 4, the dispenser wall 130 may include a lower dispenser wall 160 configured to engage the filter body 106, an upper dispenser wall 162 axially extending from the lower dispenser wall 160 and configured to be received in and engage the upper body 102 or a separate grinder portion as described in further detail below, and a ledge 164 transversely connecting the lower dispenser wall 160 and the upper dispenser wall 162 and configured to contact the upper body 102 or the separate grinder portion. Any of the connections herein, e.g., between the upper dispenser wall 162 and the upper body 102 or separate grinder portion, may include a smooth, press fit, or threaded connection. As shown in FIG. 5, the chute 110 may include an outer wall 120 and upper and lower walls 122a, 122b, e.g., to direct the product during dispensing.

Figure 10:
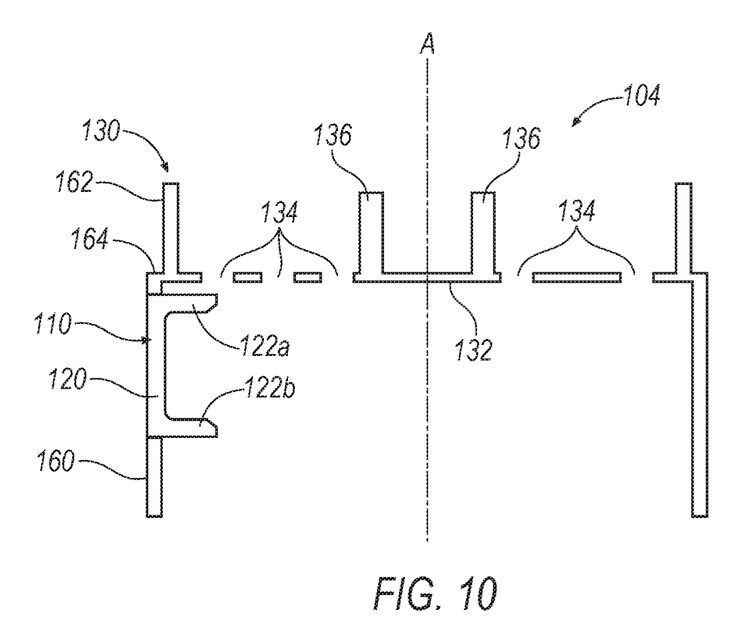
FIG. 10 illustrates a cross-section view of the dispenser.

Referring to FIGS. 6-10, the dispenser 104 may be rotatably coupled to the chute 110. As shown in FIG. 6, the dispenser 104 may include may include one or more countersinks 166a, 166b configured to receive the one or more fasteners 118a, 118b. A hinge 116 may include a hinge body 170 and hinge arms 172a, 172b with apertures 174a, 174b. Apertures 174a, 174b configured to receive fasteners 118a, 118b. The hinge 116 may be secured to an inner surface of the dispenser wall 130 as shown in FIG. 7 or an outer surface of the dispenser wall 130. Apertures 174a, 174b may be threaded, e.g., if the hinge 116 is secured to the inner surface or smooth, e.g., if the hinge 116 is secured to the outer surface. The hinge 116 may include hinge arms 172a, 172b configured to engage the chute 110. The dispenser 104 may also include recess 114, e.g., to facilitate opening of chute 110. As shown in FIGS. 8-10, the dispenser 104 may include a grinder portion (e.g., an integrated grinder portion) having a platform 132 with a plurality of holes 134 and a plurality of teeth 136.

Chute 110 may include hinge arm 180 with an aperture 182. The hinge arm 180 may be configured to be received between and engage the hinge arms 172a, 172b. Apertures 176a, 176b and aperture 182 being in aligned about a chute axis B, e.g., in a substantially concentric arrangement. Apertures 176a, 176b and aperture 182 182 may also be configured to receive fastener 118c, e.g., a threaded screw or a press fit pin. Aperture 176a or 176b may be threaded to engage the threads of fastener 118c or configured for a press fit connection if fastener 118c is a press fit pin. The chute axis B may be a distance from and substantially parallel to the central axis A, as shown in FIG. 7.

With reference to FIGS. 8-9 and 11-12, the chute 110 may include an inward stop 184 and an outward stop 186 that define a rotation range about chute axis B. Exemplary rotation ranges may include rotation up to about 10, 15, 30, 45, or 60 degrees. The inward stop 184 may configured to resist or stop inward rotation of the chute 110 in a closed configuration. The outward stop 186 may be configured to resist or stop outward rotation in an open configuration. Thus, the chute 110 may rotate between the closed and open configurations according to the rotation range defined by inward stop 184 and outward stop 186.

Figure 11:
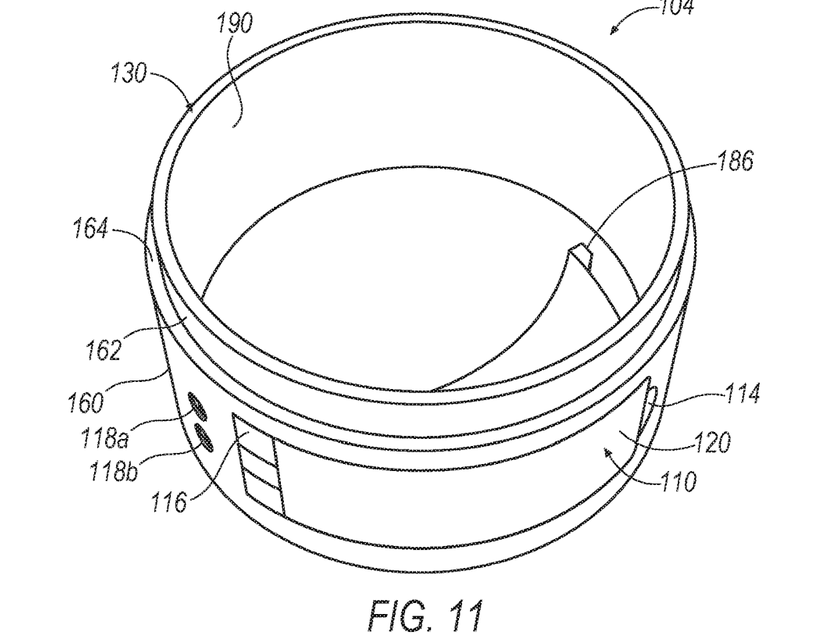
FIG. 11 illustrates an isometric view of an alternate dispenser, e.g., in a closed configuration.
Figure 12:
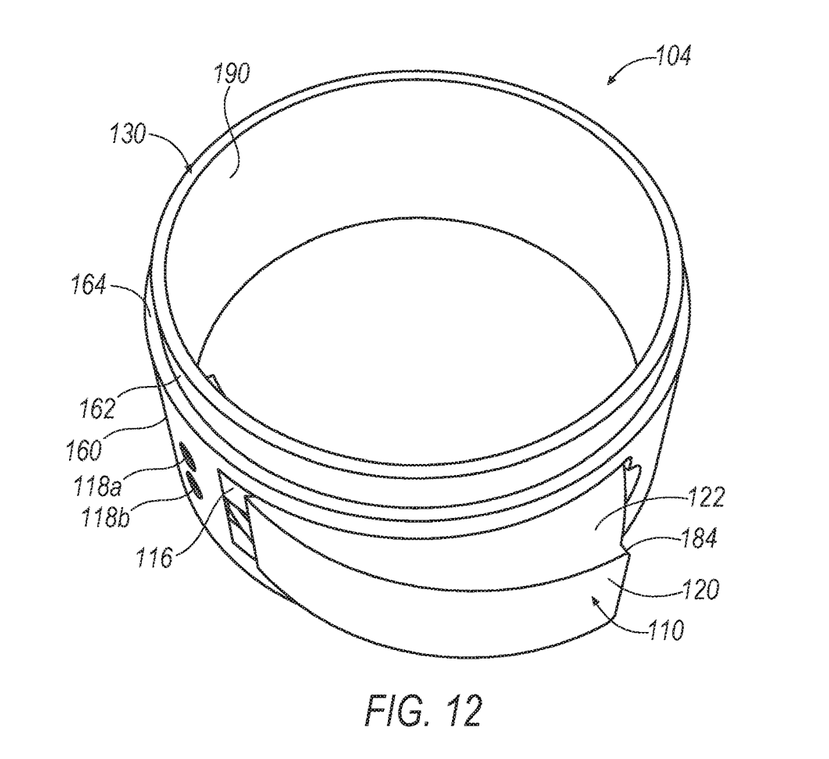
FIG. 12 illustrates an isometric view of the alternate dispenser, e.g., in an open configuration.
Figure 13:
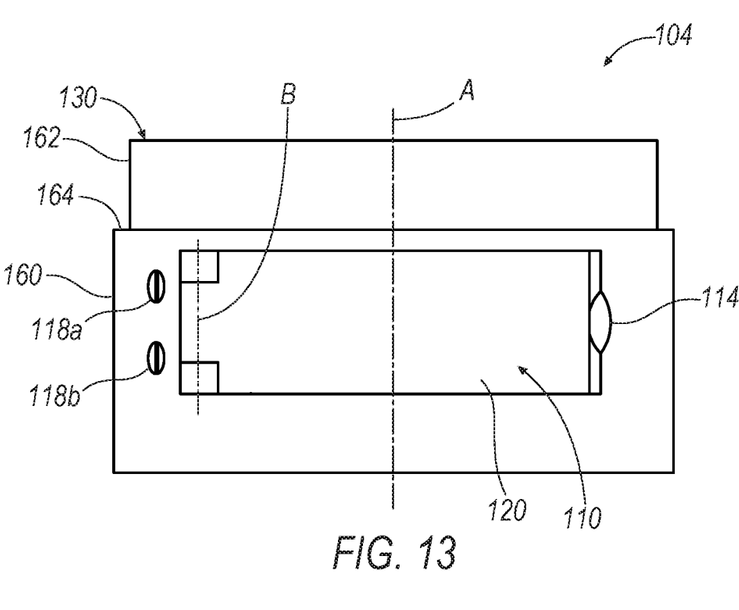
FIG. 13 illustrates a front view of the alternate dispenser.
Figure 14:
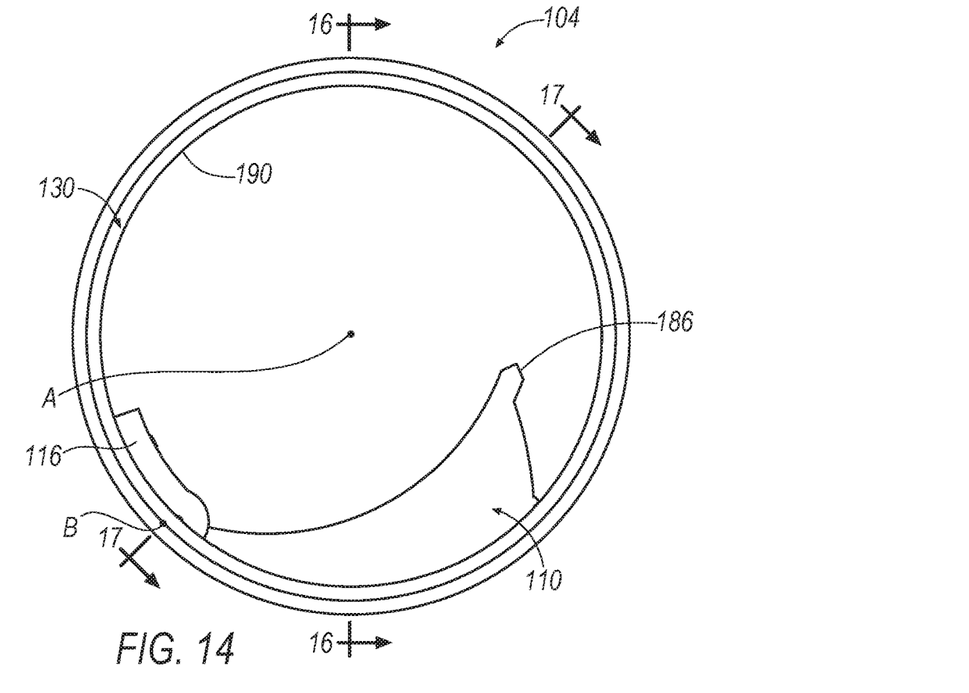
FIG. 14 illustrates a top view of the alternate dispenser, e.g., in a closed configuration.
Figure 15:
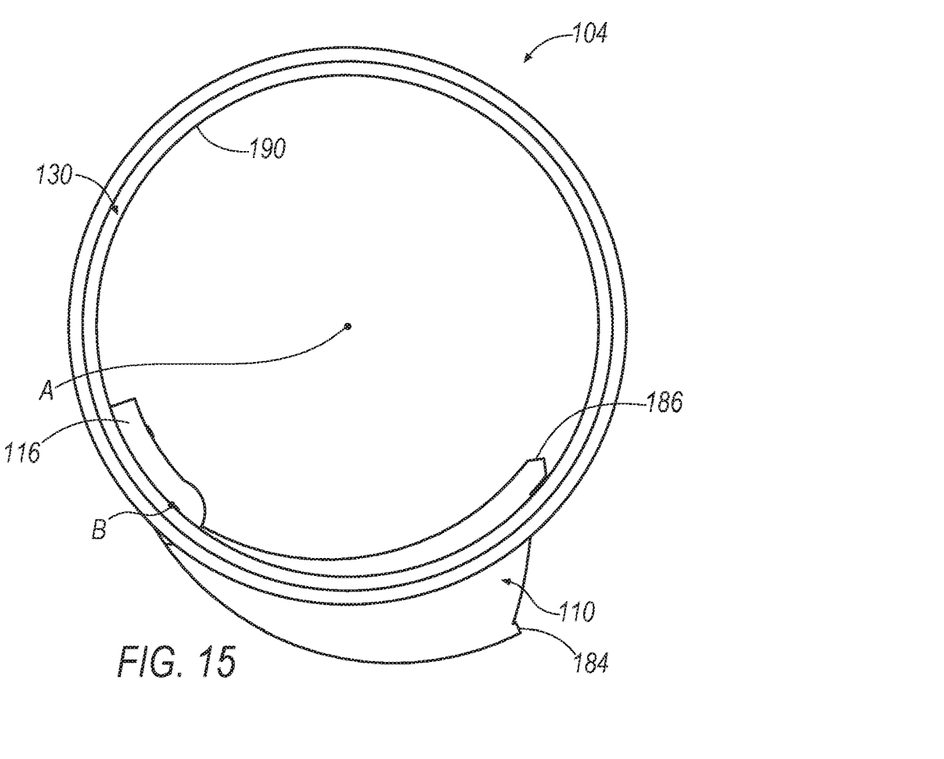
FIG. 15 illustrates a top view of the alternate dispenser, e.g., in an open configuration.
Figure 16:
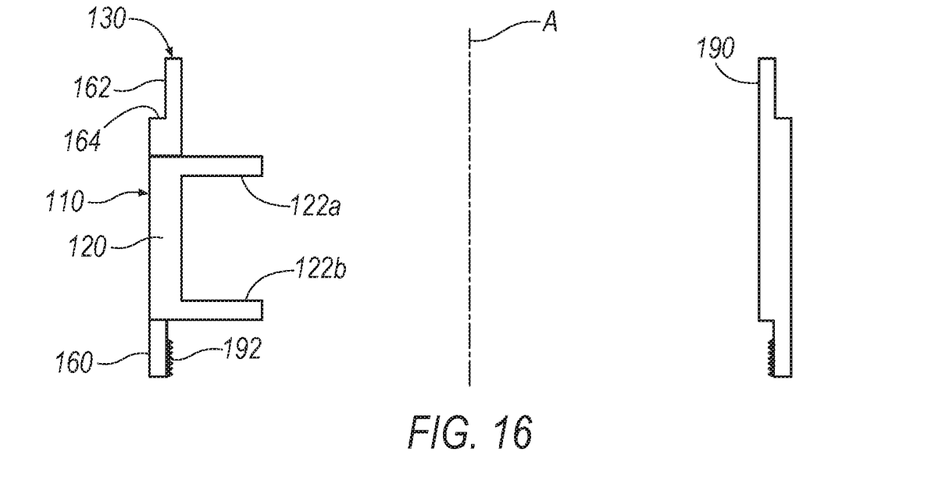
FIG. 16 illustrates a cross-section view of the alternate dispenser.
Figure 17:
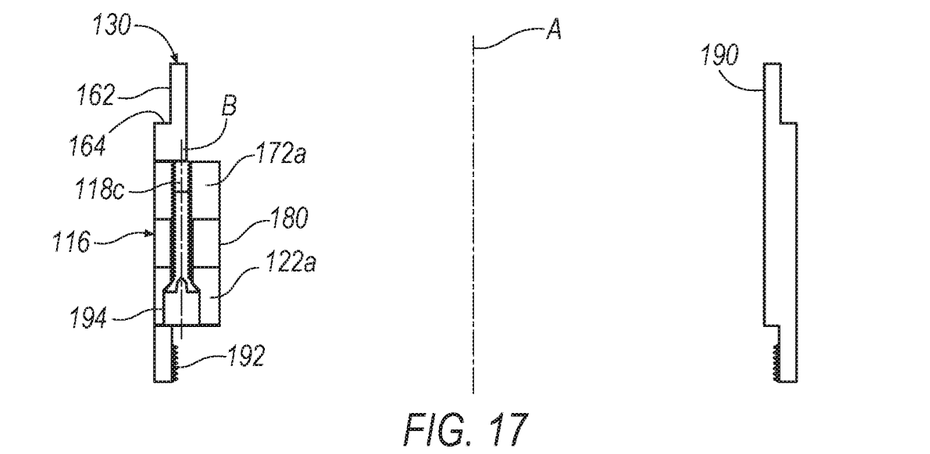
FIG. 17 illustrates another cross-section view of the alternate dispenser.

FIGS. 11-17 illustrate an exemplary dispenser 104, e.g., with features as discussed above with respect to FIGS. 4-10 but configured for a separate grinder portion. As shown in FIGS. 11-13, the dispenser wall 130 may further include a lower dispenser wall 160 configured to engage the filter body 106, an upper dispenser wall 162 configured to be received in and engage a separate grinder portion, and a ledge 164 configured to contact the separate grinder portion. Any of the connections herein, e.g., between the upper dispenser wall 162 and the upper body 102 or separate grinder portion, may include a smooth, friction fit, or threaded connection. Referring to FIGS. 14-15, the dispenser 104 may include a passage 190 configured to receive product from a separate grinder portion and dispense product with the chute 110, e.g., without disassembling the dispenser 104 from the grinder system 100. The dispenser 104 may also pass unwanted particulates to the filter body 106 to be held in the lower body 108, as discussed above. With reference to FIG. 16, the lower dispenser wall 160 may include an inner surface 192, e.g., a threaded surface to engage the filter body 106. As shown in FIG. 17, the hinge 116 may include countersink 194 configured to receive fastener 118c.

Methods of using a grinder system 100 are also contemplated. A method may include providing an upper body 102 having a plurality of teeth 128, a dispenser 104 having a dispenser wall 103 about a central axis A and with a dispenser window 112, and a chute 110 rotatably coupled to the dispenser wall 130 about a chute axis B. The method may include rotating the upper body 102 about the central axis A while the chute 110 is in a closed configuration to grind a product and rotating the chute 110 about the chute axis B to an open configuration to dispense the product. As such, the grinder system 100 may grind and dispense products without disassembly and using the chute 110 to direct the ground product.

It will be appreciated that the aforementioned method and devices may be modified to have some components and steps removed, or may have additional components and steps added, all of which are deemed to be within the spirit of the present disclosure. None of the components or steps herein are essential elements nor is their interdependency required. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A grinder comprising:
 a housing having a central axis and an outer wall;
 an upper comminuting body formed in a top of the housing, the upper comminuting body having a lower platform and a plurality of teeth;
 a dispenser body formed in the housing below the upper comminuting body, the dispenser body being configured to releasably connect to the upper comminuting body;
 a filter body formed in the housing below the dispenser body, the filter body having a filter screen, the filter body configured to releasably connect with the dispenser body, the filter screen extending to the outer wall of the housing;
 a lower waste particulate body formed in the housing below the filter body, the lower waste particulate body having a base wall and being configured to releasably connect with the filter body; and
 a dispensing chamber being defined in the dispenser body by the outer wall of the housing, the lower platform and the filter screen, a dispensing opening being formed in the outer wall of the housing between the lower platform and the filter screen, a chute having upper and lower sidewalls extending radially inwardly while being rotatably coupled to the outer wall about a chute axis, the chute being configured to cover the dispensing opening in a closed configuration and rotate about the chute axis to uncover a chute opening defined by the upper and lower sidewalls of the chute and at least a portion of the dispensing opening in an open configuration.

2. The grinder of claim 1 wherein the upper comminuting body is configured to be rotated relative to the dispenser body while the chute is in the closed configuration to grind a particulate and the chute is configured to be rotated to the open configuration.

3. The grinder of claim 1 wherein the plurality of teeth are facing the dispense body.

4. The grinder of claim 1, further comprising a grinder portion separate from the dispenser body having a platform with a plurality of holes and a second plurality of teeth facing the upper body.

5. The system of claim 4 wherein the grinder portion is configured to releasably with the upper comminuting body and the dispenser body that are held along the central axis with a magnetic connection while allowing relative rotation.

6. The grinder of claim 1 wherein the chute includes an outer stop to resist outward rotation in the open condition.

* * * * *